US011940150B2

(12) United States Patent
Thomson et al.

(10) Patent No.: US 11,940,150 B2
(45) Date of Patent: Mar. 26, 2024

(54) COMBUSTION CHAMBER ASSEMBLY WITH COLLAR SECTION AT A MIXING AIR HOLE OF A COMBUSTION CHAMBER SHINGLE

(71) Applicants: Rolls-Royce Deutschland Ltd & Co KG, Blankenfelde-Mahlow (DE); Rolls-Royce plc, London (GB)

(72) Inventors: Matthew Thomson, Chesterfield (GB); Romek Ott, Berlin (DE); Igor Sikorski, Berlin (DE); Sabina Heyen, Berlin (DE)

(73) Assignees: ROLLS-ROYCE DEUTSCHLAND LTD & CO KG, Blankenfelde-Mahlow (DE); ROLLS-ROYCE PLC, London (GB)

( * ) Notice: Subject to any disclaimer, the term of this patent is extended or adjusted under 35 U.S.C. 154(b) by 0 days.

(21) Appl. No.: 17/973,609

(22) Filed: Oct. 26, 2022

(65) Prior Publication Data

US 2023/0125918 A1 Apr. 27, 2023

(30) Foreign Application Priority Data

Oct. 26, 2021 (DE) ..................... 10 2021 212 068.7

(51) Int. Cl.
*F23R 3/06* (2006.01)
*F23R 3/00* (2006.01)

(52) U.S. Cl.
CPC ................ *F23R 3/06* (2013.01); *F23R 3/002* (2013.01); *F05D 2260/20* (2013.01)

(58) Field of Classification Search
CPC ........................................................ F23R 3/06
See application file for complete search history.

(56) References Cited

U.S. PATENT DOCUMENTS 4,700,544 A * 10/1987 Fucci ........................ F23R 3/06 60/757
11,085,639 B2 10/2021 Sauer et al.
2011/0120132 A1 5/2011 Rudrapatna et al.
(Continued)

FOREIGN PATENT DOCUMENTS

GB 2353589 2/2001

OTHER PUBLICATIONS

German Search Report dated Jul. 12, 2022 from counterpart German Patent Application No. 10 2021 212 068.7.

*Primary Examiner* — Katheryn A Malatek
(74) *Attorney, Agent, or Firm* — SHUTTLEWORTH & INGERSOLL, PLC; Timothy J. Klima

(57) ABSTRACT

A combustion chamber assembly includes a through hole on the combustion chamber wall bounded on an outer side of the wall by a hole edge and a combustion chamber shingle having a collar bounding a mixing air hole on the outer side of the wall and protruding with a first collar portion beyond the hole edge on the outer side of the wall. A cooling air opening is formed on an inner circumferential surface of a duct portion of the mixing air hole adjoining the first collar portion and extending in the direction of a combustion space, the cooling air opening leading into a cooling air duct which extends through the duct portion and via which cooling air is guided out of the mixing air hole in a direction of a hot side of the shingle facing the combustion space.

20 Claims, 4 Drawing Sheets

(56) References Cited

U.S. PATENT DOCUMENTS

| | | | | |
|---|---|---|---|---|
| 2012/0297778 | A1* | 11/2012 | Rudrapatna ............. | F23R 3/045<br>60/755 |
| 2016/0209035 | A1 | 7/2016 | Cramer | |
| 2016/0290643 | A1* | 10/2016 | Cunha ........................ | F02C 7/12 |
| 2018/0039254 | A1 | 2/2018 | North et al. | |
| 2018/0266324 | A1 | 9/2018 | Lao et al. | |
| 2020/0049349 | A1 | 2/2020 | Amble et al. | |

* cited by examiner

COMBUSTION CHAMBER ASSEMBLY WITH COLLAR SECTION AT A MIXING AIR HOLE OF A COMBUSTION CHAMBER SHINGLE

This application claims priority to German Patent Application DE102021212068.7 filed Oct. 26, 2021, the entirety of which is incorporated by reference herein.

DESCRIPTION

The proposed solution relates to a combustion chamber assembly having a combustion chamber and at least one combustion chamber shingle fixed on a combustion chamber wall of the combustion chamber.

Combustion chambers of an engine, in particular a gas turbine engine, regularly have combustion chamber shingles. A combustion chamber shingle here protects the combustion chamber housing, which forms the combustion chamber wall, against the high temperatures which arise during the combustion of fuel in the combustion chamber. In order for the combustion chamber shingles to have a sufficient service life, a ceramic protective layer is conventionally applied to the hot side of a combustion chamber shingle. Air for cooling and for leaning the combustion and therefore for reducing the NOx emissions can be conducted into the combustion chamber via the combustion chamber shingles. For this purpose, a combustion chamber shingle frequently has at least one admixing hole or mixing air hole. Conventionally, cooling air holes are also provided on a combustion chamber shingle in order to produce a cooling film with cold air on the "hot side" of the combustion chamber shingle.

For conducting air flowing along an outer side of a combustion chamber wall during the operation of the engine into a mixing air hole of the combustion chamber shingle and therefore into the combustion space of the combustion chamber, it is already known from GB 2 353 589 A1 to provide, on the combustion chamber shingle, a collar which bounds the mixing air hole on the outer side of the combustion chamber wall and which protrudes with a collar portion on the outer side of the combustion chamber wall over a hole edge of a through hole which is on the combustion chamber wall and in which the collar of the combustion chamber shingle is arranged. The collar portion protruding beyond the hole edge is arranged downstream with respect to the direction of flow of the air on the outer side of the combustion chamber wall such that air impinging on the protruding collar portion is conducted into the mixing air hole and therefore in the direction of the combustion space.

GB 2 353 589 A proposes further, alternative configurations in addition to a combustion chamber shingle having a collar portion protruding beyond the hole edge, in particular in order to guide additional cooling air onto the hot side of the combustion chamber shingle. However, the configurations proposed here are comparatively complex and also do not take sufficient account of the circumstance that a corresponding collar of the combustion chamber shingle cannot readily be positioned precisely within the through hole on the combustion chamber wall.

There is therefore a need for a combustion chamber assembly which is improved in this respect.

A proposed combustion chamber assembly provides a remedy here.

The latter comprises a combustion chamber for an engine, the combustion chamber comprising a combustion chamber wall which at least partially surrounds a combustion space of the combustion chamber and has at least one through hole, and at least one combustion chamber shingle which is fixed on an inner side of the combustion chamber wall and has a mixing air hole for guiding mixing air into the combustion space. The through hole is bounded on an outer side of the combustion chamber wall by a hole edge beyond which at least one first collar portion of a collar on the combustion chamber shingle protrudes, said collar bounding the mixing air hole on the outer side of the combustion chamber wall. At least one cooling air opening is now formed on an inner circumferential surface of a duct portion of the mixing air hole adjoining the first collar portion and extending in the direction of the combustion space, the cooling air opening leading into a cooling air duct which extends through the duct portion (in particular through a wall of the duct portion). Via said cooling air duct, cooling air can be guided out of the mixing air hole in the direction of a hot side of the combustion chamber shingle facing the combustion space.

The proposed solution therefore makes use of the air conducted through the mixing air hole in the direction of the combustion space via the protruding first collar portion, in order thereby to produce an additional cooling air flow in the direction of the hot side of the combustion chamber shingle. For this purpose, at least one cooling air opening is provided specifically in the duct portion adjoining the protruding first collar portion, in order to supply air that has already been conducted into the mixing air hole to the cooling air duct at least partially in the form of cooling air and to conduct said air via said cooling air duct in the direction of the hot side of the combustion chamber shingle. By the at least one cooling air opening being provided in the region of the first collar portion protruding over the hole edge, use is specifically made of a portion of an air flow which has been diverted in the direction of the combustion space via the first collar portion on the inner circumferential surface of the duct portion. Via the protruding first collar portion, it is therefore not only possible to achieve an improvement in the supply of the mixing air in the direction of the combustion space, but also in addition an improved provision of an additional airflow for the collar portion on the hot side and for the hot side of the combustion chamber shingle.

For efficiently guiding the cooling air out of the mixing air hole in the direction of the hot side of the combustion chamber shingle and therefore with a directional component in the direction of the combustion space, the cooling air duct runs in the duct portion at an inclination with respect to a direction of extent, along which the duct portion extends. The duct portion therefore runs, for example, radially inward in the direction of the combustion space with respect to a longitudinal axis of the combustion chamber. The cooling air duct can in turn be oriented at an inclination to specifically this radial direction of extent. For example, the cooling air duct is inclined with respect to the direction of extent of the duct portion at an angle in the range from 10° to 75°, in particular from 25° to 75° or from 40° to 70° and, for example, in the region of 60°. The direction of extent of the duct portion points from an introduction opening bounded by the collar on the outer side of the combustion chamber wall to an outlet opening of the mixing air hole, via which the mixing air passes out of the mixing air hole into the combustion space.

In one embodiment variant, the at least one cooling air opening formed on the inner circumferential surface of the duct portion has a droplet-shaped or elliptical cross section. This is understood here as meaning that the cooling air opening has a non-circular cross section and therefore, for example, has a greater extent in the direction of extent of the duct portion than in a circumferential direction about the direction of extent. A droplet-shaped or elliptical cross section may be of advantage firstly for supplying the cooling air from the mixing air hole into a cooling air duct (in particular running at an inclination) and also secondly for additive manufacturing of at least the collar of the combustion chamber shingle.

Basically, the at least one cooling air opening can be provided on a region of the circumferential surface that adjoins the first collar portion in a direction of extent of the duct portion. The at least one cooling air opening is therefore formed specifically in a region of the inner circumferential surface, along which a flow of mixing air deflected in the direction of the combustion space via the first collar portion, which protrudes on the outer side of the combustion chamber wall, flows. The cooling air opening is therefore intended to be provided specifically not on a region of the inner circumferential surface that is offset with respect to the first collar portion in the circumferential direction about the direction of extent of the collar portion.

Basically, a plurality of (at least two) cooling air openings can also be formed on the inner circumferential surface of the duct portion, the cooling air openings each leading into an associated cooling air duct. Via a plurality of cooling air ducts and cooling air openings assigned thereto, it is therefore possible for a plurality of cooling air flows to be able to be generated in the direction of the hot side of the combustion chamber shingle at a shingle mixing air hole. In particular, it is possible for an additional cooling air film to be able to be generated on the hot side of the combustion chamber shingle via a plurality of such cooling air flows. In one embodiment variant, for example, more than 5, in particular 6 to 9 cooling air openings are formed on the inner circumferential surface of the duct portion of the mixing air hole.

Basically, the plurality of cooling air openings can also each be provided (only) in a region of the circumferential surface that adjoins the first collar portion in the direction of extent. Depending on the circumferential extent of the first collar portion, a smaller or larger region on the inner circumferential surface is therefore formed with cooling air openings.

In one embodiment variant, the collar of the combustion chamber shingle that bounds the mixing air hole on the outer side of the combustion chamber wall has at least one further, second collar portion which, however, on the outer side of the combustion chamber wall, does not protrude beyond the hole edge of the through hole on the combustion chamber wall. The second collar portion therefore extends, for example, at maximum within the through hole as far as the hole edge. This includes, in particular, the possibility that, with respect to an air flow flowing along the outer side of the combustion chamber wall during operation of the engine, the first collar portion lies opposite, with a region protruding furthest from the hole edge downstream and with a region of the second collar portion that is maximally spaced apart from the hole edge.

A cooling air opening is then typically not provided on the circumferential surface on the region of the duct portion that adjoins the second collar portion in the direction of extent of the duct portion of the mixing air hole. A back flow of cooling air originating from the mixing air hole should therefore be limited or even eliminated.

In particular with regard to efficient guiding of the air flow(s), an embodiment variant makes provision for the second collar portion to merge continuously into the first collar portion. The collar of the combustion chamber shingle that is provided for the outer side of the combustion chamber wall therefore does not have any points of discontinuity on its circumference between the two collar portions. On the contrary, it is provided that the collar runs uniformly in the circumferential direction and therefore its height increases uniformly, for example, from the second collar portion to the first collar portion.

Basically, a region of the second collar portion can also be set back in relation to the hole edge. An edge of the second collar portion is consequently then present at least locally within the through opening of the combustion chamber wall and does not reach as far as the hole edge. The edge of the second collar portion therefore does not end flush in this region with the hole edge, but rather lies at a deeper point than the hole edge. This results in the formation of a local recess which improves an inflow of air into the mixing air hole in general, but also the inflow of air in the direction of a cooling air opening opposite the recess. Such a recess can assist the admission of mixing air at an upstream, front edge of the hole edge with respect to the direction of flow of the air on the outer side of the combustion chamber wall.

Basically, at least the collar of the combustion chamber shingle that bounds the mixing air hole can be produced additively. In the case of additive, layer-by-layer production of the collar of the combustion chamber shingle, the manufacturing then takes place, for example, along a manufacturing direction pointing from the second collar portion to the first collar portion. In this way, the second collar portion can serve during the additive manufacturing process as a supporting structure for the first collar portion. The additive manufacturing is therefore not inconsiderably simplified.

In an embodiment variant, the first collar portion protruding over the hole edge extends, for example, over at least a fifth (1/5), in particular over at least a quarter (1/4) and/or over a maximum of three-fifths (3/5), in particular over a maximum of half, of a circumference of the mixing air hole. If a cooling air opening or a plurality of cooling air openings is or are provided only in regions of the circumferential surface that adjoin the protruding first collar portion in the direction of extent, a region of the circumferential surface, on which cooling air openings are formed, consequently also extends in a circumferential direction over at least 1/5, in particular at least 1/4 and/or a maximum of 3/5, in particular a maximum of half, of a circumference of the duct portion.

In addition to a collar protruding in sections on the outer side of the combustion chamber wall, in an embodiment variant, the duct portion of the mixing air hole is formed with a further, second protruding collar at an end projecting into the combustion space (and therefore on a hot side of the combustion chamber shingle). The collar on the hot side can protrude, in particular annularly, in relation to adjacent portions of a shingle surface of the combustion chamber shingle facing the combustion space. An annular design of a collar does not inevitably include a circular-ring-shaped configuration here. A collar at the end on the hot side of the duct portion of the mixing air hole can further improve the targeted supply of the mixing air flow.

In order, in addition, to facilitate the positioning of the collar, which bounds the mixing air hole on the outer side of the combustion chamber wall, in the through hole of the combustion chamber wall or, during the installation of the combustion chamber shingle on the combustion chamber wall, to ensure a certain position and therefore orientation of the collar within the through hole, an embodiment variant makes provision for at least one positioning portion for predetermining a certain position of the collar in the through hole to be provided on the collar.

The at least one positioning portion is then formed here, for example, on an outer circumferential surface of the first collar portion. The at least one positioning portion can be formed here, for example, on the outer circumferential surface of the collar, and in particular of the first collar portion, in a manner protruding in the direction of an inner circumferential surface of the through hole. The positioning portion is therefore then designed, for example, so as to project transversely with respect to a direction of extent of the duct portion of the mixing air hole. In a mounted state, the positioning portion is therefore present at a smaller distance from the inner circumferential surface of the through hole or even lies on the inner circumferential surface of the through hole, while regions of the collar away from the positioning portion are spaced apart (to a greater extent) from the inner circumferential surface. A (narrow) gap can therefore be present between the regions of the collar lying away from the positioning portion and the inner circumferential surface of the through hole.

It can be ensured via a positioning portion or at least two spaced-apart positioning portions (which are in particular offset circumferentially with respect to one another) which are formed on the collar that the collar engages with a defined orientation along at least one spatial direction, preferably along two mutually perpendicular spatial directions, in the through hole on the combustion chamber wall. In such a way, in particular a floating mounting of the collar in the through hole can be excluded. Furthermore, a reproducible, more precise positioning of the combustion chamber shingle is possible.

For example, two positioning portions offset by at least 60°, in particular by 90° to each other can be provided circumferentially, in particular in each case as local thickened portions on the outer circumferential surface of the first collar portion protruding over the hole edge and therefore projecting therebeyond.

In an embodiment variant, a configuration of the combustion chamber shingle is provided in which a base which projects in the direction of the inner side of the combustion chamber wall and from which the collar bounding the mixing air on the outer side of the combustion chamber wall protrudes is formed on a cold side of the combustion chamber shingle that faces the inner side of the combustion chamber wall. In the mounted state of the combustion chamber assembly, the collar therefore protrudes from said base into the through hole on the combustion chamber wall—and at least with the first collar portion even through the through hole. For example, a step, for example an annular step, but not necessarily a circular-ring-shaped step, is formed at a transition from the projecting base to the collar bounding the mixing air hole on the outer side of the combustion chamber wall.

In such an embodiment variant, the projecting base and the collar consequently have different external dimensions, and therefore the collar is set back in relation to an outer edge of the base. This includes, for example, the fact that the collar is set back in a circumferential encircling manner with respect to a direction of extent of the duct portion. A consequently arising circumferential offset between the base and the collar can then be used partially, for example, for the formation of one or more positioning portions.

A further aspect of the proposed solution relates to the provision of an engine, in particular a gas turbine engine and here in particular a turbofan engine, having an embodiment variant of a proposed combustion chamber assembly.

The appended figures illustrate, by way of example, possible embodiment variants of the proposed solution.

In the figures:

FIG. 1 shows, in detail, an embodiment variant of a proposed combustion chamber assembly having a mixing air hole on a combustion chamber shingle, said mixing air hole being bounded both on a cold side and on a hot side by an encircling collar;

FIG. 2 shows, in an enlarged illustration and in detail, the combustion chamber shingle looking at the cold side and the collar, on the cold side, which is formed with a circumferentially variable height, and therefore, in the mounted state, a first duct portion protrudes over a hole edge of a through hole of the combustion chamber wall according to FIG. 1 and a second collar portion extends at maximum as far as said hole edge;

Figure 3A:
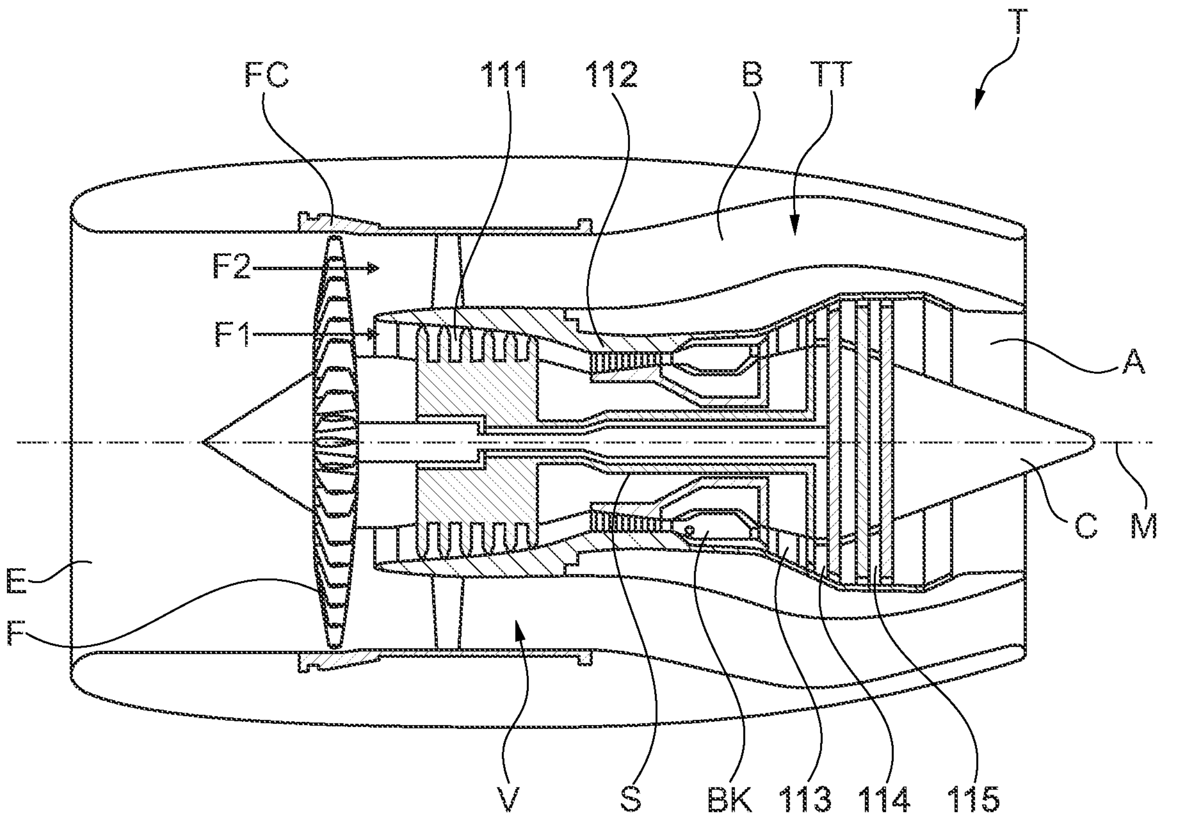
FIG. 3A shows a schematic sectional illustration of a gas turbine engine in which a proposed combustion chamber assembly is used.

FIG. 3A illustrates, schematically and in a sectional illustration, a (turbofan) engine T in which the individual engine components are arranged one behind the other along an axis of rotation or central axis M, and the engine T is formed as a turbofan engine. At an inlet or intake E of the engine T, air is drawn in along an inlet direction by means of a fan F. This fan F, which is arranged in a fan casing FC, is driven by means of a rotor shaft S which is set in rotation by a turbine TT of the engine T. The turbine TT here adjoins a compressor V, which has, for example, a low-pressure compressor 111 and a high-pressure compressor 112, and optionally also a medium-pressure compressor. On the one hand, the fan F conducts air in a primary airflow F1 to the compressor V, and, on the other hand, to generate thrust, in a secondary air flow F2 to a secondary flow duct or bypass duct B. The bypass duct B here runs around a core engine comprising the compressor V and the turbine TT and comprising a primary flow duct for the air supplied to the core engine by the fan F.

The air fed into the primary flow duct via the compressor V enters a combustion chamber BK of the core engine, in which the driving energy for driving the turbine TT is generated. For this purpose, the turbine TT has a high-pressure turbine 113, a medium-pressure turbine 114 and a low-pressure turbine 115. Here, the energy released during the combustion is used by the turbine TT to drive the rotor shaft S and thus the fan F in order to generate the required thrust by means of the air conveyed into the bypass duct B. Both the air from the bypass duct B and the exhaust gases from the primary flow duct of the core engine flow out via an outlet A at the end of the engine T. In this arrangement, the outlet A generally has a thrust nozzle with a centrally arranged outlet cone C.

Figure 3B:
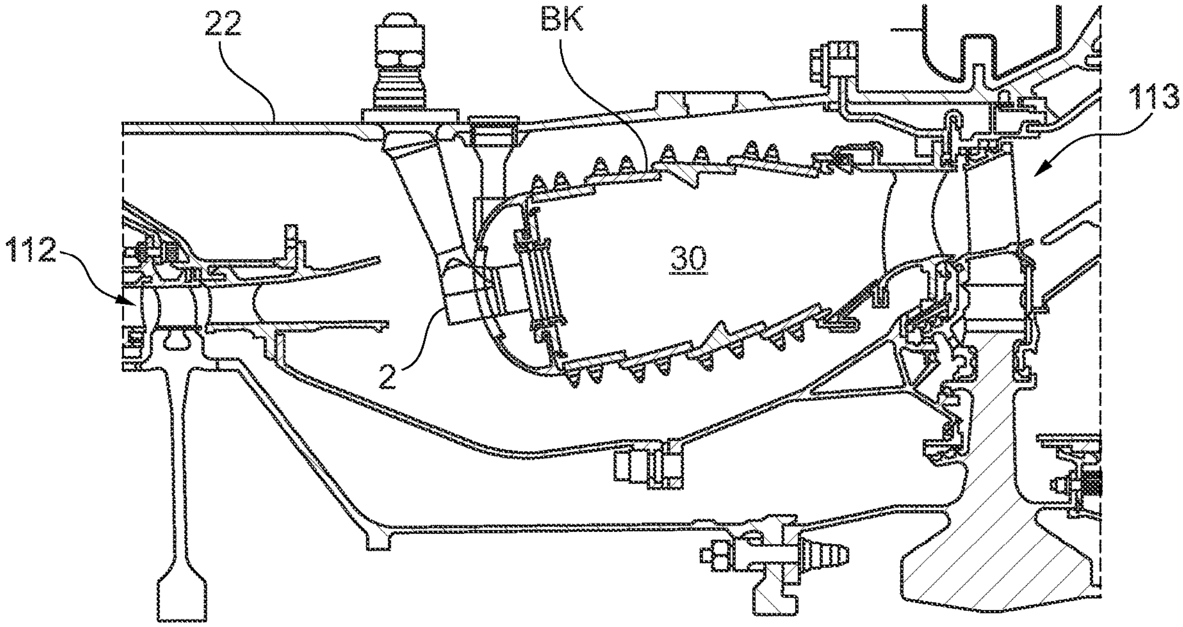
FIG. 3B shows a schematic sectional illustration of a combustion chamber of the gas turbine engine of FIG. 3A.

FIG. 3B shows a longitudinal section through the combustion chamber portion BK of the engine T. The combustion chamber BK is designed here as an annular combustion chamber which forms part of an embodiment variant of a proposed combustion chamber assembly. A nozzle assembly is provided for the injection of fuel or an air-fuel mixture into a combustion space 30 of the combustion chamber BK. Said nozzle assembly comprises a combustion chamber ring, on which multiple fuel nozzles 2 are arranged along a circular line around the central axis M. Here, on the combustion chamber ring, there are provided the nozzle outlet openings of the respective fuel nozzles 2 which are situated within the combustion chamber BK. Here, each fuel nozzle 2 comprises a flange by means of which a fuel nozzle 2 is screwed to an outer casing 22.

Figure 3C:
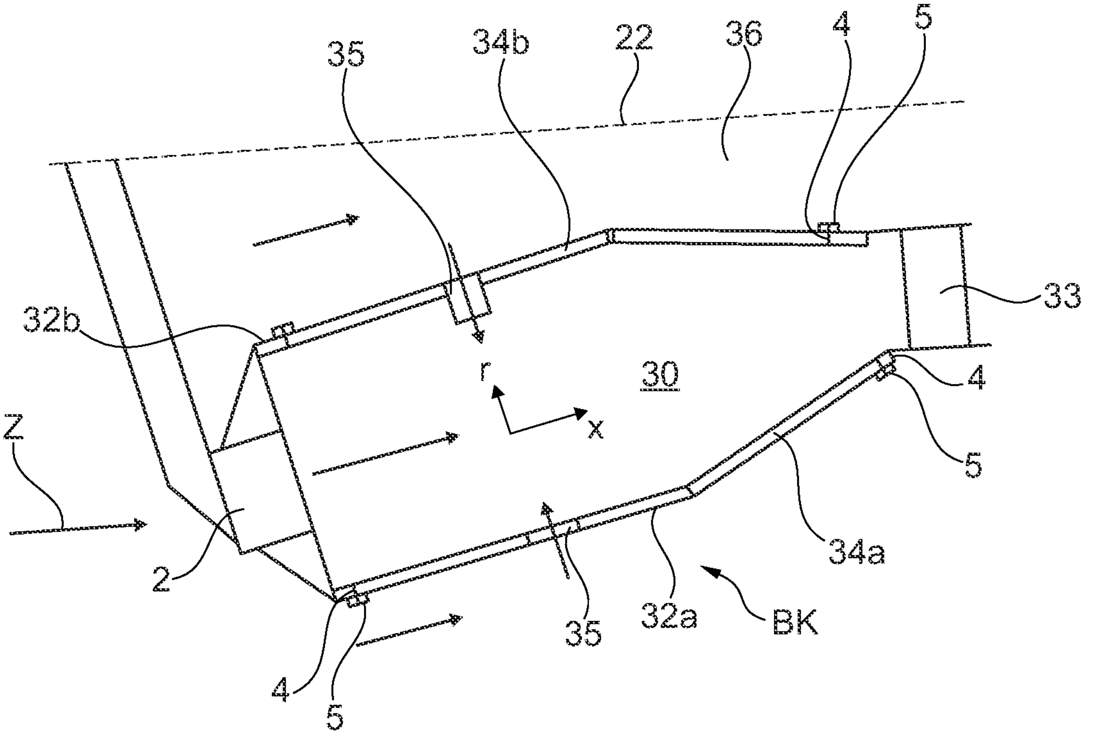
FIG. 3C shows, in detail, an enlarged sectional illustration of a combustion chamber with a combustion chamber shingle.

A configuration of the combustion chamber BK is illustrated in more detail in the enlarged sectional illustration of FIG. 3C. The combustion chamber BK here comprises the fuel nozzle 2 which is held in a combustion chamber head. Fuel is injected into the combustion space 30 of the combustion chamber BK via the fuel nozzle 2. The exhaust gases of the mixture ignited within the combustion space 30 pass in an axial direction x via a turbine inlet guide vane row 33 to the high-pressure turbine 113 in order to set the turbine stages into rotation.

The combustion space 30 is delimited by, with respect to the central axis M of the engine T, radially inner and radially outer combustion chamber walls 32*a*, 32*b* of a combustion chamber housing of the combustion chamber BK, said walls each extending firstly along the axial direction x and secondly along a circumferential direction about said axial direction x. The combustion chamber walls 32*a* and 32*b* therefore extend firstly along the axial direction x along the central axis M and along the circumferential direction. A radial direction r runs perpendicularly both to the axial direction x and to the circumferential direction. Air, for example, flows along said radial direction r into the combustion space 3 via admixing holes 35.

Combustion chamber shingles 34*a*, 34*b* are arranged on the inner side of the combustion chamber walls 32*a*, 32*b*. The combustion chamber walls 32*a*, 32*b* therefore surround the combustion space 30 of the combustion chamber BK and support the combustion chamber shingles 34*a*, 34*b* with which the combustion chamber walls 32*a*, 32*b* are covered in order to permit additional cooling and to withstand the high temperatures prevailing within the combustion space 30.

The combustion chamber shingles 34*a*, 34*b* are each held here on the respective inner or outer combustion chamber wall 32*a*, 32*b* via one or more bolts 4. Each bolt 4 reaches here through an opening on the combustion chamber wall 32*a* or 32*b* and is fixed on the combustion chamber wall 32*a* or 32*b* via a respective nut 5. For example, via a plurality of effusion cooling holes provided on a combustion chamber shingle 34*a* or 34*b*, cooling of the respective combustion chamber shingle 34*a* or 34*b* is permitted. In addition, a combustion chamber shingle 34*a*, 34*b* can have at least one admixing hole 35 via which air can flow into the combustion space 30 from a surrounding exterior space. The air flowing via an admixing hole 35 serves for the cooling and/or the leaning of the combustion.

The exterior space surrounding the combustion chamber BK, for example in the form of an annular duct, forms an air supply 36 for the admixing holes 35 (and possible effusion cooling holes). Air flowing into the combustion chamber BK along an inflow direction Z is divided here in the region of the fuel nozzle 2 via a portion configured in the manner of a hood into a primary air flow for the combustion space 30 and a secondary air flow for the surrounding exterior space with the air supply 36. The air conventionally flows here into the combustion chamber BK via a diffuser (not illustrated).

Figure 1:
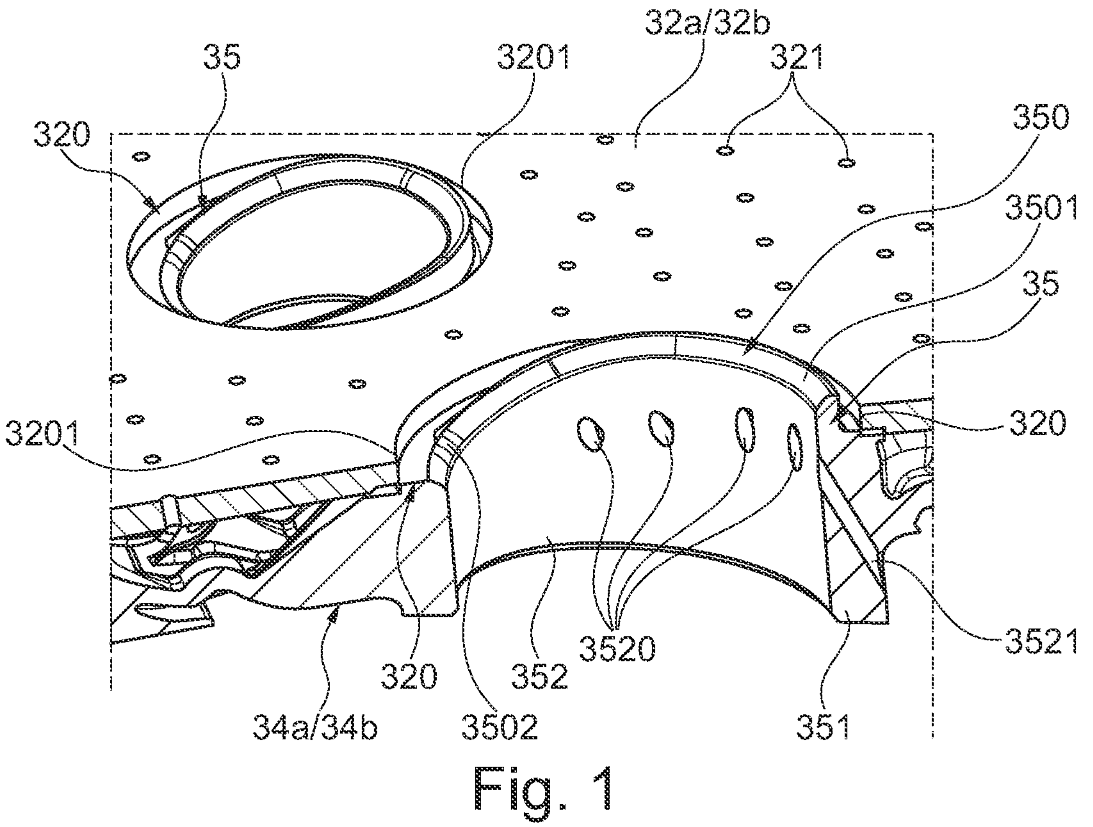
Figure 2:
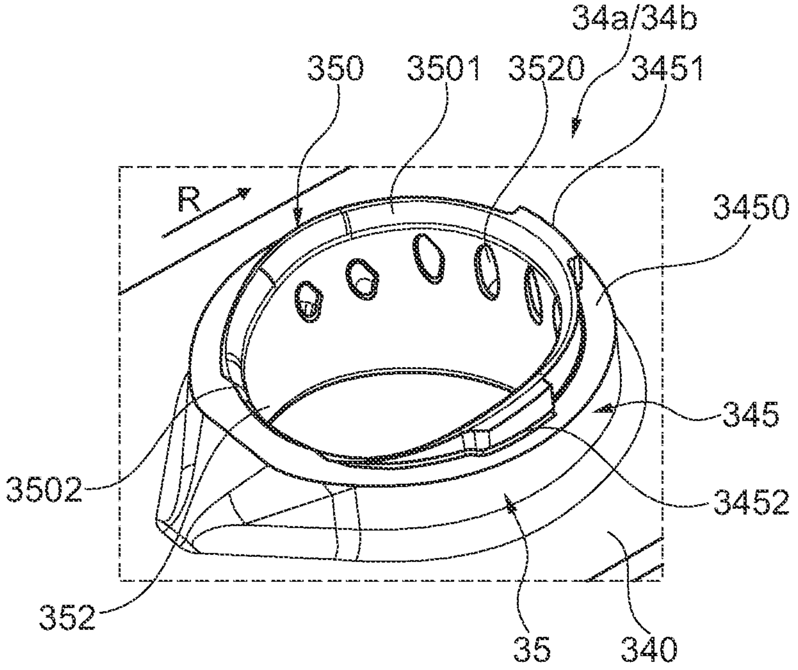

FIGS. 1 and 2 each show, in detail, in different enlarged illustrations, details of an embodiment variant of a proposed combustion chamber assembly, in which a combustion chamber shingle 34*a*, 34*b* has a collar 350 bounding a mixing air hole 35 on the outer side of the combustion chamber wall 32*a*, 32*b*. Said collar 350 has a first collar portion 3501 which protrudes on the outer side of the combustion chamber wall 32*a*, 32*b* beyond a hole edge 3201 of a through hole 320 on the combustion chamber wall, in which the collar 350 on the combustion chamber shingle is accommodated. Consequently, the collar 350 of the combustion chamber shingle 34*a*, 34*b* protrudes at least with the first collar portion 3501 beyond the hole edge 3201 on the outer side of the combustion chamber wall 32*a*, 32*b*.

The collar 350, in addition to the first collar portion 3501 protruding beyond the hole edge 3201, also has a second collar portion 3502 which lies below the hole edge 3201 (cf. in particular FIG. 1) and consequently extends at maximum as far as said hole edge 3201. The second collar portion 3502 lies upstream of the first collar portion 3501 with respect to a direction of flow of air flowing along the outer side of the combustion chamber wall 32*a* or 32*b* during operation of the engine. In this way, air can flow on the outer side of the combustion chamber wall at least in part beyond the second collar portion 3502 to the first collar portion 3501 protruding over the hole edge 3201, where the air is deflected via said first collar portion 3501 (to a greater extent) into the mixing air hole 35. On the upstream second collar portion 3502, at least one local recess is formed with respect to the hole edge 3201, via which, however, the admission of an airflow into the mixing air hole 35 is likewise assisted.

As is shown in particular by way of the detailed illustration in FIG. 2, the collar portions 3501 and 3502 merge continuously into one another, wherein the first collar portion 3501 extends over approximately half of the circumference of the mixing air hole 35.

The collar 350, on the cold side, is adjoined in the radial direction r by a duct portion of the mixing air hole 35, the duct portion defining an inner circumferential surface 352. In a region of said circumferential surface 352 adjoining the first collar portion 3501 here directly in the radial direction r and thus in the direction of extent of the duct portion, a plurality of (here eight or nine) cooling air openings 3520 are formed on the inner circumferential surface 352 in a manner spaced apart from one another on the inner circumferential surface 352. Via said cooling air openings 3520 which are present below the first collar portion 3501 in the illustration of FIGS. 1 and 2, air can pass out of the mixing air hole 35 into cooling air ducts 3521 in the duct portion of the mixing air hole 35. Each cooling air opening 3520 is assigned precisely one cooling air duct 3521 here. Each cooling air duct 3521 runs here at an inclination with respect to the radial direction r and therefore at an inclination with respect to the direction of extent of the mixing air hole 35 within the duct portion, for example at an inclination by an angle of approximately 60°. A cooling air duct 3521 ends here on the hot side of the combustion chamber shingle 34*a*, 34*b* facing the combustion space. Cooling air can therefore be guided out of the mixing air hole 35 to the hot side of the combustion chamber shingle 34*a*, 34*b* via the cooling air openings 3520 and the cooling air ducts 3521 thereof. By means of the arrangement in the immediate spatial vicinity of the protruding first collar portion 3501, the supply of cooling air into the cooling air openings 3520 is assisted here.

Via the cooling air openings 3520 and the associated cooling air ducts 3521 thereof, use is therefore made of some of the mixing air flow in order to guide a cooling air flow to the hot side of the combustion chamber shingle 34*a*, 34*b*. The first collar portion 3501 protruding over the hole edge 3201 therefore not only permits an improved "trapping" and deflection of air flowing on the outer side of the combustion chamber wall 32*a*, 32*b* into the respective mixing air hole 35. On the contrary, this also—in combination with the cooling air openings 3520 on the mixing air hole side— makes an improved cooling air flow to the hot side of the combustion chamber shingle 34*a*, 34*b* possible. For the cooling of the cold side of the combustion chamber shingle 34*a*, 34*b* facing the inner side of the combustion chamber wall 32*a*, 32*b*, the combustion chamber wall 32*a*, 32*b* in turn has a multiplicity of cooling air holes 321.

The cooling air openings 3520 each have a droplet-shaped or elliptical cross section extending longitudinally here in the radial direction r. Such a cross section is advantageous for additive manufacturing of the combustion chamber shingle 34*a*, 34*b* and in particular of the protruding collar 350. The collar 350 is thus produced additively along a manufacturing direction R, for example according to FIG. 2, and therefore the second collar portion 3502 can form a supporting structure for the first collar portion 3501 during the additive manufacturing process.

The external dimensions of the collar 352 protruding into the through hole 320 on the combustion chamber wall are smaller here than the dimensions of the through hole 320. In order nevertheless to permit exact positioning of the collar 350 here in the through hole 320, at least two positioning portions 3451 and 3452 are formed on the collar 350. Via said two positioning portions 3451 and 3452, the position of the collar 350 within the through hole 320 is determined along two spatial directions in the plane of the through hole 320. For this purpose, the positioning portions 3451 and 3452 are arranged offset by 90° to one another on an outer circumferential surface of the collar 350 and here in particular on an outer circumferential surface of the first collar portion 3501 and are each designed as local thickened portions which project in the direction of an inner surface of the through hole 320. In the correctly mounted state of the combustion chamber shingle 34*a*, 34*b*, a respective positioning portion 3451, 3452 can therefore lie against the inner circumferential surface of the through hole 320 and can therefore predetermine a certain position and therefore orientation for the collar 350 within the through hole 320.

The outer circumferential surface of the collar 350 is set back here in relation to a step 3450 which is formed at a transition of the collar 350 to a base 345 protruding on the cold side of the combustion chamber shingle. Said base 345 is formed in a manner protruding on a shingle base surface 340 of the combustion chamber shingle 34*a*, 34*b* in the direction of the inner side of the combustion chamber wall 32*a*, 32*b* and supports the collar 350 which therefore extends further, starting from the base 345, into the through hole 320 of the combustion chamber wall 32*a*, 32*b*.

In addition to the collar 350, on the cold side, with the collar portions 3501 and 3502 protruding to differing extents, the combustion chamber shingle 34*a*, 34*b* illustrated in FIGS. 1 and 2 also has a (further) collar 351 on the hot side at the end of the duct portion of the mixing air hole 35. Said collar 351, on the hot side, therefore protrudes at least slightly on the hot side of the combustion chamber shingle 34*a*, 34*b* and defines an outlet opening, which protrudes in relation to adjacent portions of the combustion chamber shingle 34*a*, 34*b*, for mixing air which is guided into the combustion space 30 via the mixing air hole 35. By this means, a more targeted inflow of the mixing air into a certain zone of the combustion space 30 is possible. The inflowing mixing air can also be separated to a greater extent from the air guided via the cooling air openings 3520 and the cooling air ducts 3521 thereof additionally to the hot side of the combustion chamber shingle 34*a*, 34*b*.

LIST OF REFERENCE SIGNS

111 Low-pressure compressor
112 High-pressure compressor
113 High-pressure turbine
114 Medium-pressure turbine
115 Low-pressure turbine
2 Fuel nozzle
22 Outer housing
30 Combustion space
32*a*, 32*b* Inner/outer combustion chamber wall
320 Through hole
3201 Hole edge
321 Cooling air hole
33 Turbine inlet guide vane row
34*a*, 34*b* Inner/outer combustion chamber shingle
340 Shingle base surface
345 Base
3450 Step
3451, 3452 Positioning portion
35 Admixing hole/mixing air hole
350 Collar, on the cold side
3501 First collar portion
3502 Second collar portion
351 Collar, on the hot side
352 Inner circumferential surface
3520 Cooling air opening
3521 Cooling air duct
36 Air supply
4 Bolt
5 Nut
A Outlet
B Bypass duct
BK Combustion chamber
C Outlet cone
E Inlet/Intake
F Fan
F1, F2 Fluid flow
FC Fan casing
M Central axis/Axis of rotation
r Radial direction/direction of extent
R Manufacturing direction
S Rotor shaft
T (Turbofan) engine
TT Turbine
V Compressor
x Axial direction
Z Inflow direction

The invention claimed is:

1. A combustion chamber assembly, comprising:

a combustion chamber for an engine, the combustion chamber comprising a combustion chamber wall which at least partially surrounds a combustion space of the combustion chamber, the combustion chamber wall including a through hole being peripherally bounded on an outer side of the combustion chamber wall by a hole edge, and a combustion chamber shingle which is fixed on an inner side of the combustion chamber wall, a mixing air hole including a duct portion with an inner circumferential surface for guiding mixing air through the combustion chamber wall and the combustion chamber shingle into the combustion space, the duct portion at least partly extending through the through hole and including a collar bounding the duct portion on an outer side away from the combustion space, the collar being attached to the combustion chamber shingle, a cooling air opening positioned on the inner circumferential surface and extending in a direction of the combustion space, the cooling air opening leading into a cooling air duct which extends through the duct portion and via which cooling air can be guided out of the mixing air hole in a direction of a hot side of the combustion chamber shingle facing the combustion space, the collar including an outer peripheral edge, the outer peripheral edge including a first collar portion on a downstream side of the outer peripheral edge and a second collar portion on an opposing upstream side of the outer peripheral edge across the duct portion, the first collar portion protruding outwardly away from the combustion space beyond the hole edge on the outer side of the combustion chamber wall, the second collar portion not protruding outwardly away from the combustion space beyond the hole edge on the outer side of the combustion chamber wall.

2. The combustion chamber assembly according to claim 1, wherein the duct portion extends along a direction of extent and the cooling air duct runs in the duct portion at an inclination with respect to the direction of extent.

3. The combustion chamber assembly according to claim 1, wherein the cooling air opening has a droplet-shaped or elliptical cross section.

4. The combustion chamber assembly according to claim 1, wherein the duct portion extends along a direction of extent and the cooling air opening is provided on a region of the circumferential surface that adjoins the first collar portion in the direction of extent.

5. The combustion chamber assembly according to claim 1, and further comprising a plurality of the cooling air openings positioned on the inner circumferential surface of the duct portion and a plurality of the cooling air ducts, the plurality of cooling air openings each leading into a respective one of the plurality of cooling air ducts.

6. The combustion chamber assembly according to claim 5, wherein the plurality of cooling air openings are each provided in a region of the circumferential surface that adjoins the first collar portion in the direction of extent.

7. Combustion chamber assembly according to claim 1, wherein the cooling air opening is not provided on the circumferential surface on a region of the duct portion that adjoins the second collar portion in a direction of extent.

8. The combustion chamber assembly according to claim 1, wherein the second collar portion merges continuously into the first collar portion.

9. The combustion chamber assembly according to claim 1, wherein at least one region of the second collar portion is set back in relation to the hole edge.

10. The combustion chamber assembly according to claim 1, wherein at least the collar has been formed additively, specifically along a manufacturing direction pointing from the second collar portion to the first collar portion.

11. The combustion chamber assembly according to claim 1, wherein the first collar portion protruding over the hole edge extends over at least a fifth of a circumference of the mixing air hole.

12. The combustion chamber assembly according to claim 11, wherein the first collar portion protruding over the hole edge extends over a maximum of three-fifths of the circumference of the mixing air hole.

13. The combustion chamber assembly according to claim 1, wherein the duct portion includes a further collar protruding into the combustion space.

14. The combustion chamber assembly according to claim 1, wherein the collar includes at least one positioning portion for predetermining a certain position of the collar in the through hole on the outer side of the combustion chamber wall.

15. The combustion chamber assembly according to claim 14, wherein the at least one positioning portion is formed on an outer circumferential surface of the collar, and protrudes in a direction of an inner circumferential surface of the through hole.

16. The combustion chamber assembly according to claim 14, wherein the at least one positioning portion includes at least two spaced-apart positioning portions formed on the collar.

17. The combustion chamber assembly according to claim 1, and further comprising a base which projects in a direction of an inner side of the combustion chamber wall and from which the collar protrudes, the base positioned on a cold side of the combustion chamber shingle that faces the inner side of the combustion chamber wall.

18. The combustion chamber assembly according to claim 17, and further comprising a step positioned at a transition from the base to the collar.

19. A gas turbine engine having the combustion chamber which has at least one of the combustion chamber assemblies according to claim 1.

20. The combustion chamber assembly according to claim 1, wherein the first collar portion protruding over the hole edge extends over a maximum of three-fifths of a circumference of the mixing air hole.

* * * * *